US012794538B2

(12) United States Patent
Yuan et al.

(10) Patent No.: US 12,794,538 B2
(45) Date of Patent: Nov. 10, 2026

(54) MULTIPLE TRANSMIT RECEIVE POINT BEAM SETTING FOR UNIFIED TRANSMISSION CONFIGURATION INDICATOR STATE

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 316 days.

(21) Appl. No.: 18/720,240

(22) PCT Filed: Mar. 3, 2022

(86) PCT No.: PCT/CN2022/078946

§ 371 (c)(1),
(2) Date: Jun. 14, 2024

(87) PCT Pub. No.: WO2023/164856

PCT Pub. Date: Sep. 7, 2023

(65) Prior Publication Data

US 2025/0062817 A1 Feb. 20, 2025

(51) Int. Cl.

| | |
|---|---|
| ***H04B 7/06*** | (2006.01) |
| ***H04L 5/00*** | (2006.01) |
| ***H04W 72/23*** | (2023.01) |

(52) U.S. Cl.

CPC ....... *H04B 7/06964* (2023.05); *H04L 5/0048* (2013.01); *H04W 72/23* (2023.01)

(58) Field of Classification Search

CPC ... H04B 7/06964; H04B 7/024; H04W 72/23; H04L 5/0048; H04L 5/0055;

(Continued)

(56) References Cited

U.S. PATENT DOCUMENTS

2020/0314818 A1 10/2020 Jin et al.
2020/0350972 A1* 11/2020 Yi .......................... H04B 7/022

(Continued)

FOREIGN PATENT DOCUMENTS

WO WO-2021167528 A1 * 8/2021 ............. H04B 7/022
WO WO-2021198922 A1 10/2021

OTHER PUBLICATIONS

International Search Report and Written Opinion—PCT/CN2022/078946—ISA/EPO—Nov. 23, 2022.

*Primary Examiner* — Mewale A Ambaye
(74) *Attorney, Agent, or Firm* — Harrity & Harrity, LLP

(57) ABSTRACT

Various aspects of the present disclosure generally relate to wireless communication. In some aspects, a user equipment (UE) may transmit a beam failure recovery (BFR) message that indicates beam failure of a transmit receive point (TRP) among multiple TRPs and that includes a TRP identifier for the TRP and an index for a new beam. The UE may receive, in response to the BFR message, a physical downlink control channel communication. The UE may set the new beam for the TRP for one or more channels or reference signals that share a unified transmission configuration indicator state with a channel or a reference signal associated with the index. The UE may transmit or receive a communication using the new beam. Numerous other aspects are described.

28 Claims, 13 Drawing Sheets

(58) Field of Classification Search
CPC . H04L 5/0053; H04L 5/0023; H04L 7/06952; H04L 5/0091
See application file for complete search history.

(56) References Cited

U.S. PATENT DOCUMENTS

| | | | | |
|---|---|---|---|---|
| 2022/0103233 | A1* | 3/2022 | Zhou | H04B 7/088 |
| 2022/0104302 | A1* | 3/2022 | Zhou | H04B 7/06964 |
| 2022/0132517 | A1* | 4/2022 | Zhu | H04L 5/0051 |
| 2023/0171621 | A1* | 6/2023 | Zhu | H04W 24/04<br>370/242 |

* cited by examiner

TRP0-> BFR RS set q0,0-> NBI RS set q1,0-> CORESET pool index 0
TRP1-> BFR RS set q0,1-> NBI RS set q1,1-> CORESET pool index 1

MULTIPLE TRANSMIT RECEIVE POINT BEAM SETTING FOR UNIFIED TRANSMISSION CONFIGURATION INDICATOR STATE

CROSS-REFERENCE TO RELATED APPLICATION

This Patent Application is a 371 national stage of PCT Application No. PCT/CN2022/078946 filed on Mar. 3, 2022, entitled "MULTIPLE TRANSMIT RECEIVE POINT BEAM SETTING FOR UNIFIED TRANSMISSION CONFIGURATION INDICATOR STATE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for setting a beam with a unified transmission configuration indicator state for a transmit receive point (TRP) among multiple TRPs.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a beam failure recovery (BFR) message that indicates beam failure of a transmit receive point (TRP) among multiple TRPs and that includes a TRP identifier (ID) for the TRP and an index for a new beam. The method may include receiving, in response to the BFR message, a physical downlink control channel (PDCCH) communication. The method may include setting the new beam for the TRP for one or more channels or reference signals that share a unified transmission configuration indicator (TCI) state with a channel or a reference signal associated with the index. The method may include transmitting or receiving a communication using the new beam.

Some aspects described herein relate to a method of wireless communication performed by a network entity. The method may include receiving a BFR message that indicates beam failure of a TRP among multiple TRPs and that includes a TRP ID for the TRP and an index for a new beam. The method may include transmitting, in response to the BFR message, a PDCCH communication. The method may include setting the new beam for the TRP for one or more channels or reference signals that share a unified TCI state with a channel or a reference signal associated with the index. The method may include transmitting or receiving a communication using the new beam.

Some aspects described herein relate to a UE for wireless communication. The UE may include a memory and one or more processors coupled to the memory. The one or more processors may be configured to transmit a BFR message that indicates beam failure of a TRP among multiple TRPs and that includes a TRP ID for the TRP and an index for a new beam. The one or more processors may be configured to receive, in response to the BFR message, a PDCCH communication. The one or more processors may be configured to set the new beam for the TRP for one or more channels or reference signals that share a unified TCI state with a channel or a reference signal associated with the index. The one or more processors may be configured to transmit or receive a communication using the new beam.

Some aspects described herein relate to a network entity for wireless communication. The network entity may include a memory and one or more processors coupled to the memory. The one or more processors may be configured to receive a BFR message that indicates beam failure of a TRP among multiple TRPs and that includes a TRP ID for the TRP and an index for a new beam. The one or more processors may be configured to transmit, in response to the BFR message, a PDCCH communication. The one or more processors may be configured to set the new beam for the TRP for one or more channels or reference signals that share a unified TCI state with a channel or a reference signal associated with the index. The one or more processors may be configured to transmit or receive a communication using the new beam.

Some aspects described herein relate to a non-transitory computer-readable medium that stores a set of instructions for wireless communication by a UE. The set of instructions, when executed by one or more processors of the UE, may cause the UE to transmit a BFR message that indicates beam failure of a TRP among multiple TRPs and that includes a TRP ID for the TRP and an index for a new beam. The set of instructions, when executed by one or more processors of the UE, may cause the UE to receive, in response to the BFR message, a PDCCH communication. The set of instructions, when executed by one or more processors of the UE, may cause the UE to set the new beam for the TRP for one or more channels or reference signals that share a unified TCI state with a channel or a reference signal associated with the index. The set of instructions, when executed by one or more processors of the UE, may cause the UE to transmit or receive a communication using the new beam.

Some aspects described herein relate to a non-transitory computer-readable medium that stores a set of instructions for wireless communication by a network entity. The set of instructions, when executed by one or more processors of the network entity, may cause the network entity to receive a BFR message that indicates beam failure of a TRP among multiple TRPs and that includes a TRP ID for the TRP and an index for a new beam. The set of instructions, when executed by one or more processors of the network entity, may cause the network entity to transmit, in response to the BFR message, a PDCCH communication. The set of instructions, when executed by one or more processors of the network entity, may cause the network entity to set the new beam for the TRP for one or more channels or reference signals that share a unified TCI state with a channel or a reference signal associated with the index. The set of instructions, when executed by one or more processors of the network entity, may cause the network entity to transmit or receive a communication using the new beam.

Some aspects described herein relate to an apparatus for wireless communication. The apparatus may include means for transmitting a BFR message that indicates beam failure of a TRP among multiple TRPs and that includes a TRP ID for the TRP and an index for a new beam. The apparatus may include means for receiving, in response to the BFR message, a PDCCH communication. The apparatus may include means for setting the new beam for the TRP for one or more channels or reference signals that share a unified TCI state with a channel or a reference signal associated with the index. The apparatus may include means for transmitting or receiving a communication using the new beam.

Some aspects described herein relate to an apparatus for wireless communication. The apparatus may include means for receiving a BFR message that indicates beam failure of a TRP among multiple TRPs and that includes a TRP ID for the TRP and an index for a new beam. The apparatus may include means for transmitting, in response to the BFR message, a PDCCH communication. The apparatus may include means for setting the new beam for the TRP for one or more channels or reference signals that share a unified TCI state with a channel or a reference signal associated with the index. The apparatus may include means for transmitting or receiving a communication using the new beam.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
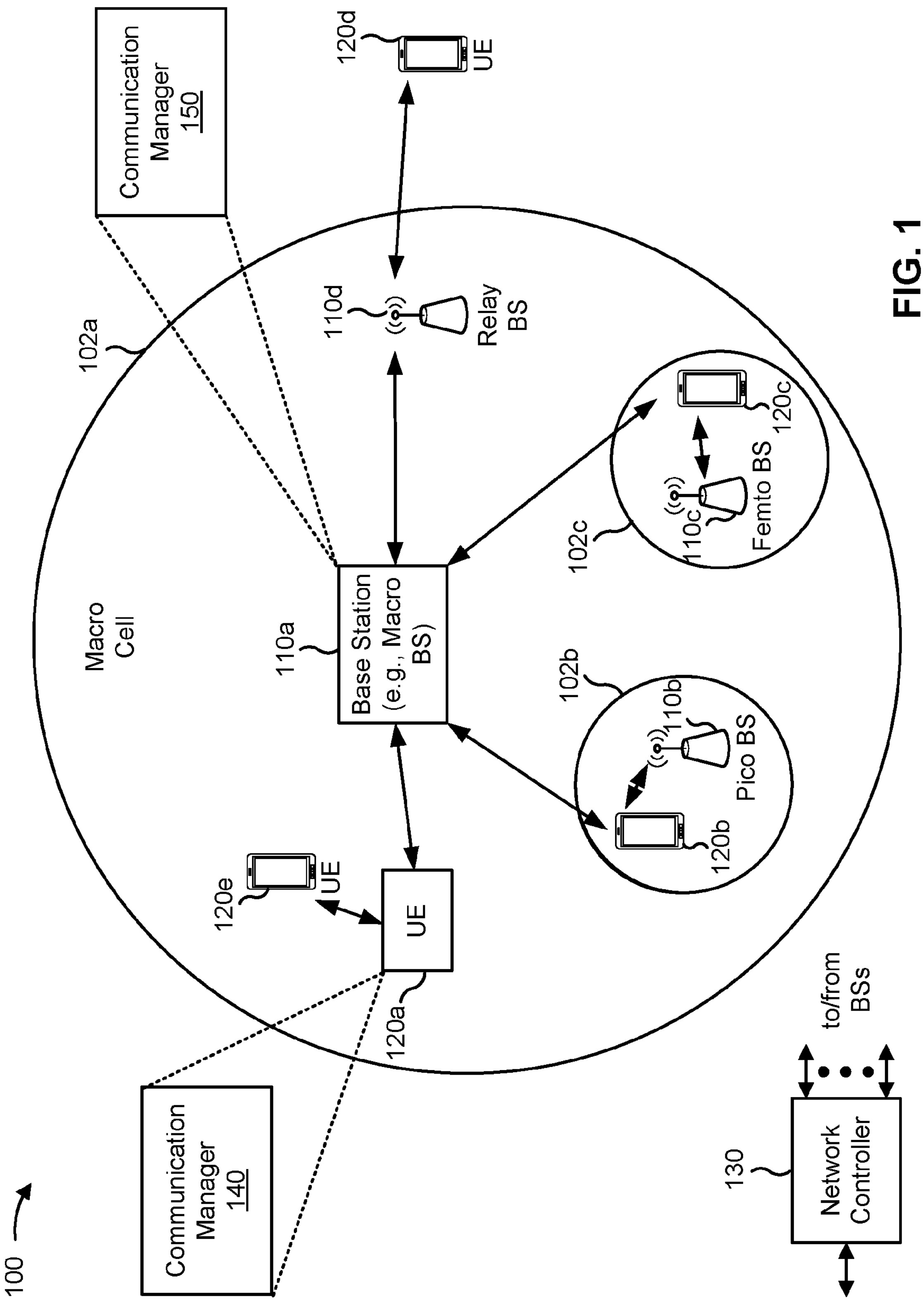
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120*a*, a UE 120*b*, a UE 120*c*, a UE 120*d*, and a UE 120*e*). The wireless network 100 may also include one or more network entities, such as base stations 110 (shown as a BS 110*a*, a BS 110*b*, a BS 110*c*, and a BS 110*d*), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a beam failure recovery (BFR) message that indicates beam failure of a TRP among multiple TRPs and that includes a TRP identifier (ID) for the TRP and an index for a new beam. The communication manager 140 may receive, in response to the BFR message, a physical downlink control channel (PDCCH) communication. The communication manager 140 may set the new beam for the TRP for one or more channels or reference signals that share a unified transmission configuration indicator (TCI) state with a channel or a reference signal associated with the index. The communication manager 140 may transmit or receive a communication using the new beam. Additionally, or alternatively, the communication manager 140 may perform one or more other operations described herein.

In some aspects, the network entity may include a communication manager 150. As described in more detail elsewhere herein, the communication manager 150 may receive a BFR message that indicates beam failure of a TRP among multiple TRPs and that includes a TRP ID for the TRP and an index for a new beam. The communication manager 150 may transmit, in response to the BFR message, a PDCCH communication. The communication manager 150 may set the new beam for the TRP for one or more channels or reference signals that share a unified TCI state with a channel or a reference signal associated with the index. The communication manager 150 may transmit or receive a communication using the new beam. Additionally, or alternatively, the communication manager 150 may perform one or more other operations described herein.

As indicated above, FIG. 1 is provided as an example. Other examples may differ from what is described with regard to FIG. 1.

Figure 2:
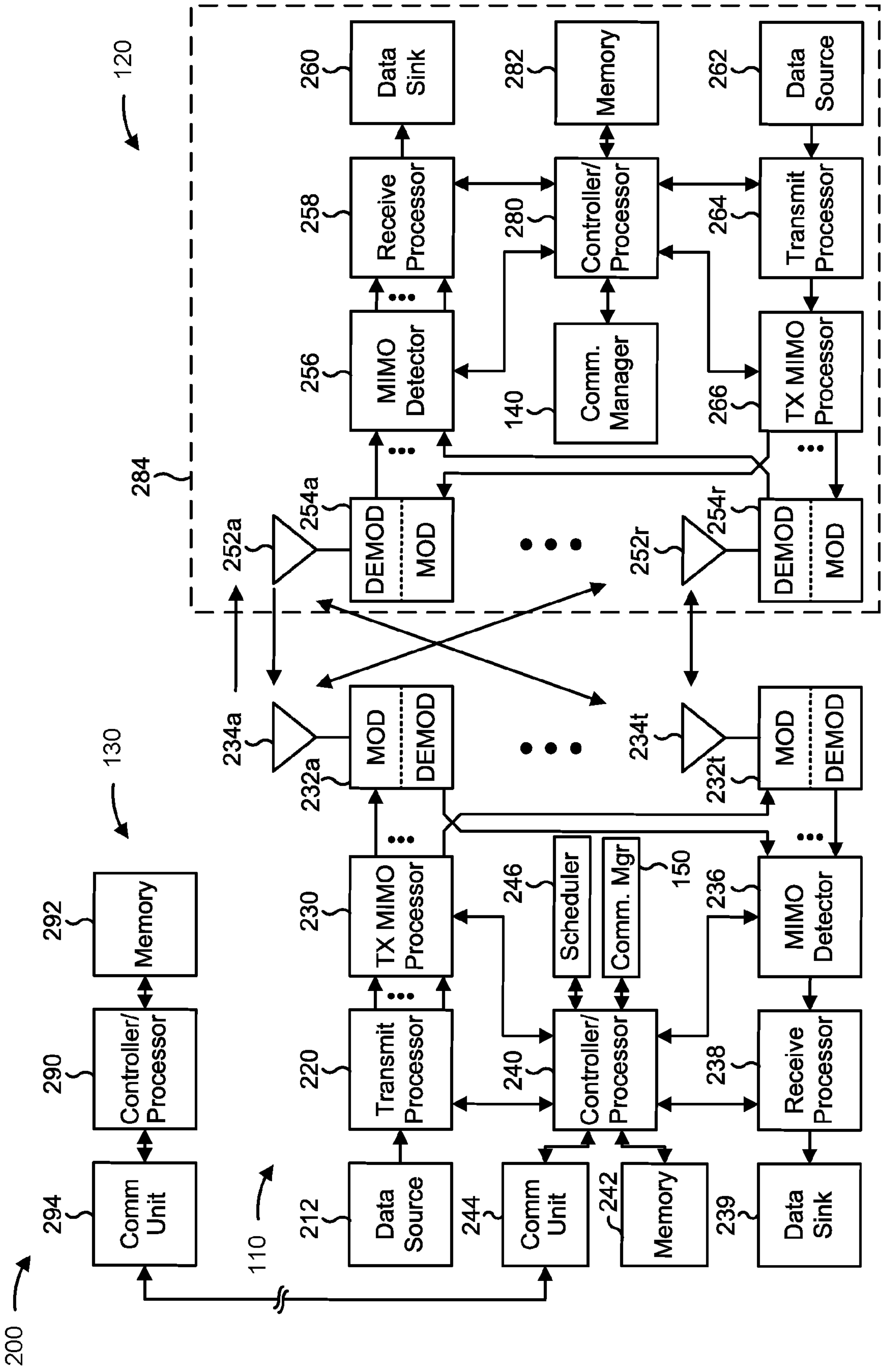
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna (s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

A controller/processor of a network entity, (e.g., the controller/processor 240 of the base station 110), the controller/processor 280 of the UE 120, and/or any other component(s) of FIG. 2 may perform one or more techniques associated with setting a beam with a unified TCI state for a TRP among multiple TRPs, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for transmitting a BFR message that indicates beam failure of a TRP among multiple TRPs and that includes a TRP ID for the TRP and an index for a new beam; means for receiving, in response to the BFR message, a PDCCH communication; means for setting the new beam for the TRP for one or more channels or reference signals that share a unified TCI state with a channel or a reference signal associated with the index; and/or means for transmitting or receiving a communication using the new beam. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for receiving a BFR message that indicates beam failure of a TRP among multiple TRPs and that includes a TRP ID for the TRP and an index for a new beam; means for transmitting, in response to the BFR message, a PDCCH communication; means for setting the new beam for the TRP for one or more channels or reference signals that share a unified TCI state with a channel or a reference signal associated with the index; and/or means for transmitting or receiving a communication using the new beam. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
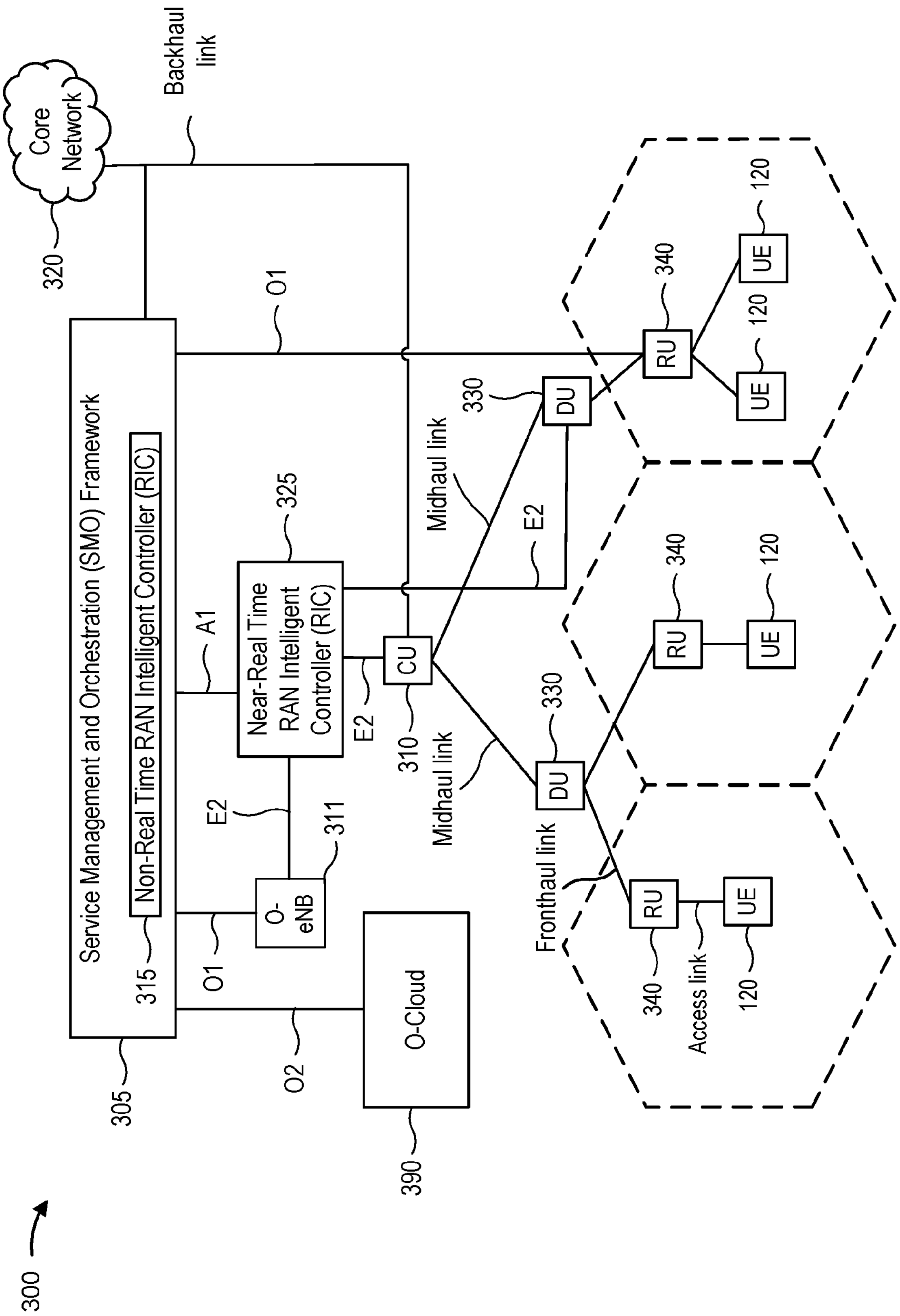
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUS (O-DUs") and "O-RAN RUS (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
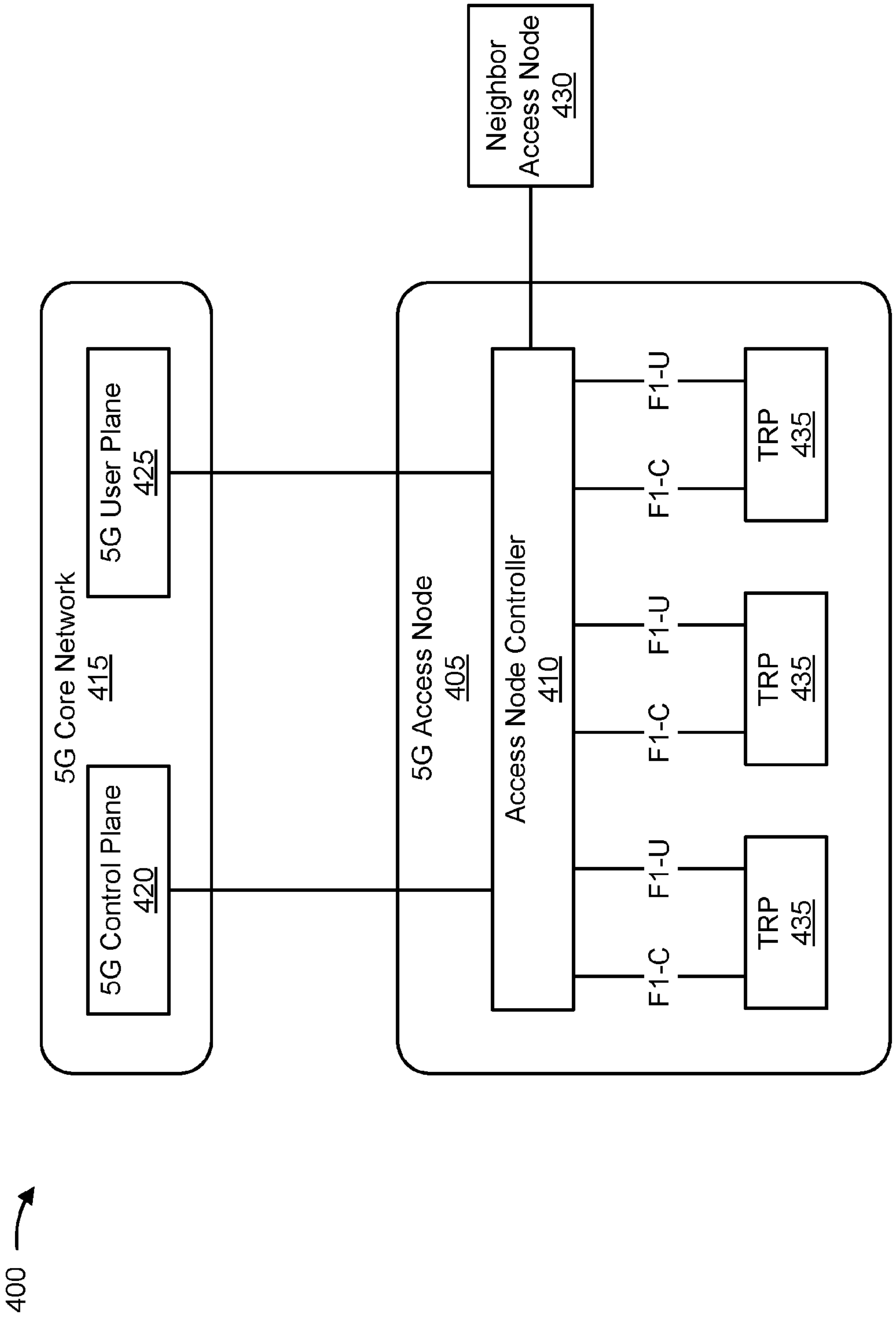
FIG. 4 illustrates an example logical architecture of a distributed radio access network, in accordance with the present disclosure.

FIG. 4 illustrates an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a DU of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400. For example, a PDCP layer, an RLC layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different TCI states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
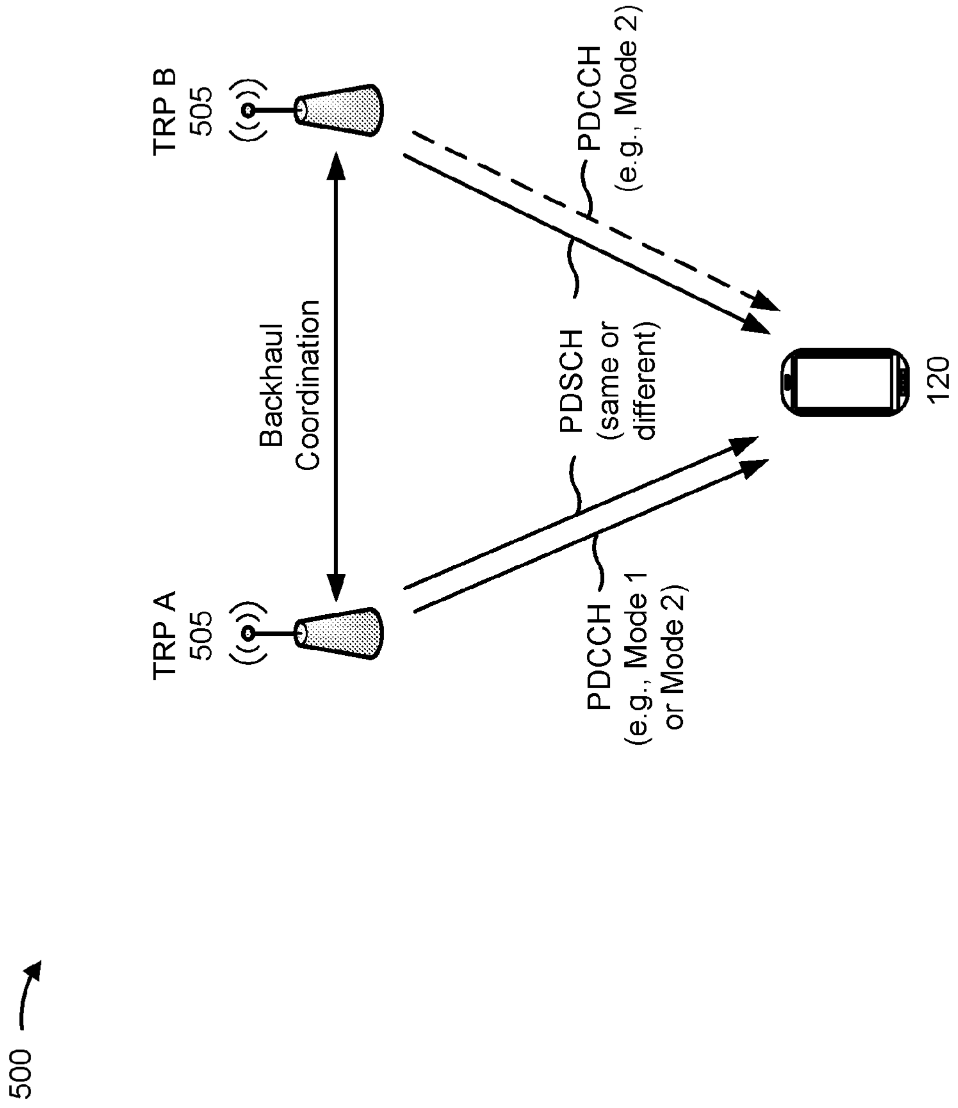
FIG. 5 is a diagram illustrating an example of multi-transmit receive point (TRP) communication (sometimes referred to as multi-panel communication), in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same base station 110 (e.g., when the TRPs 505 are different antenna arrays or panels of the same base station 110), and may have a larger delay and/or lower capacity (as compared to co-location) when the TRPs 505 are located at different base stations 110. The different TRPs 505 may communicate with the UE 120 using different QCL relationships (e.g., different TCI states), different DMRS ports, and/or different layers (e.g., of a multi-layer communication).

In a first multi-TRP transmission mode (e.g., Mode 1), a single PDCCH may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 5 is provided as an example. Other examples may differ from what is described with respect to FIG. 5.

Figure 6:
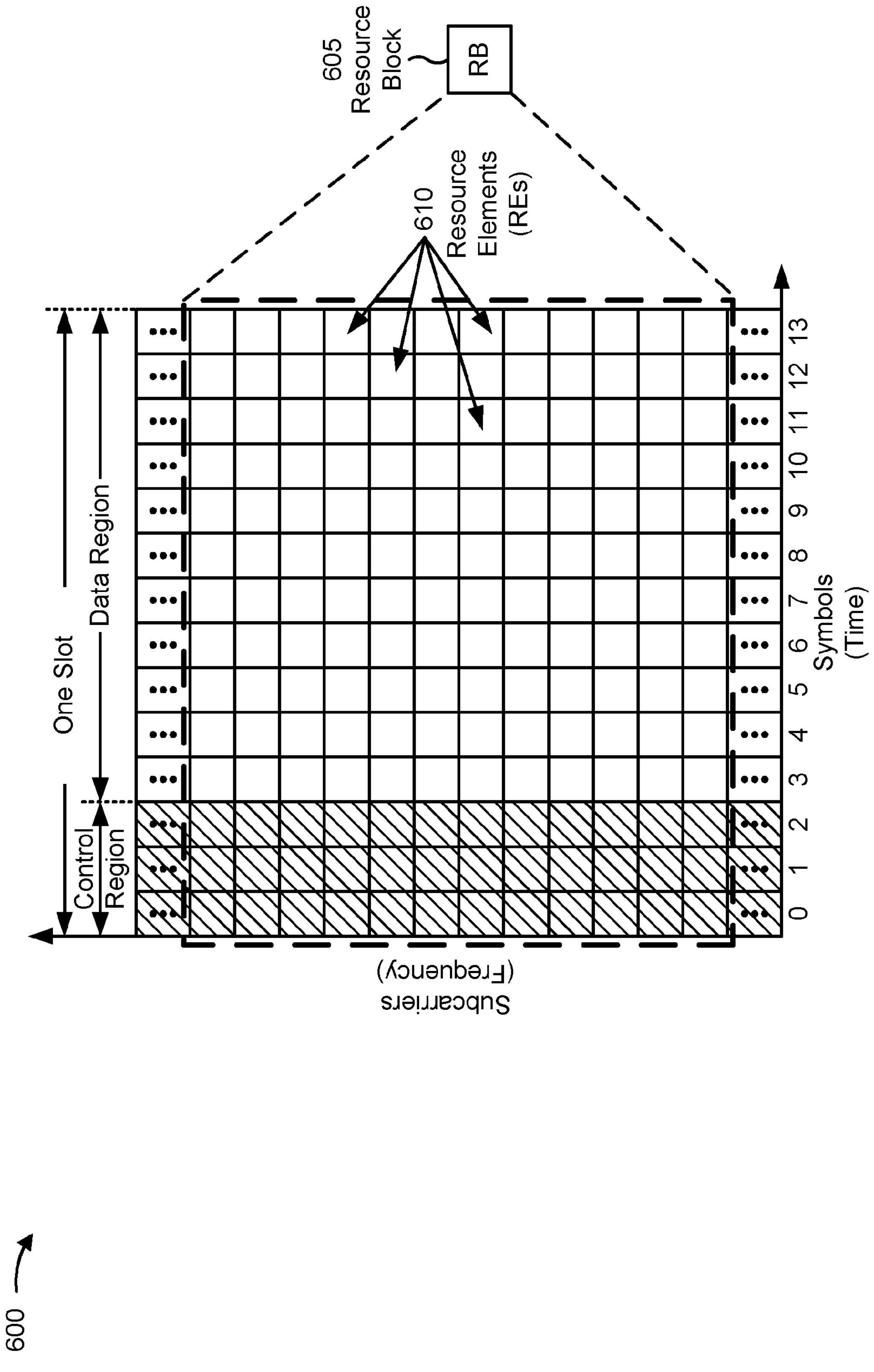
FIG. 6 is a diagram illustrating an example of a slot format, in accordance with the present disclosure.

FIG. 6 is a diagram illustrating an example 600 of a slot format, in accordance with the present disclosure. As shown in FIG. 6, time-frequency resources in a radio access network may be partitioned into resource blocks, shown by a single resource block (RB) 605. An RB 605 is sometimes referred to as a physical resource block (PRB). An RB 605 includes a set of subcarriers (e.g., 12 subcarriers) and a set of symbols (e.g., 14 symbols) that are schedulable by a base station 110 as a unit. In some aspects, an RB 605 may include a set of subcarriers in a single slot. As shown, a single time-frequency resource included in an RB 605 may be referred to as a resource element (RE) 610. An RE 610 may include a single subcarrier (e.g., in frequency) and a single symbol (e.g., in time). A symbol may be referred to as an OFDM symbol. An RE 610 may be used to transmit one modulated symbol, which may be a real value or a complex value.

In some telecommunication systems (e.g., NR), RBs 605 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As shown, a downlink channel may include a PDCCH that carries DCI, a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

The uplink channel may also carry an uplink reference signal, such as a sounding reference signal (SRS). An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink channel state information (CSI) acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

A base station 110 may configure a UE 120 with one or more SRS resource sets to allocate resources for SRS transmissions by the UE 120. For example, a configuration for SRS resource sets may be indicated in an RRC message (e.g., an RRC configuration message or an RRC reconfiguration message). An SRS resource set may include one or more resources (e.g., shown as SRS resources), which may include time resources and/or frequency resources (e.g., a slot, a symbol, a resource block, and/or a periodicity for the time resources).

As indicated above, FIG. 6 is provided as an example. Other examples may differ from what is described with regard to FIG. 6.

Figure 7:
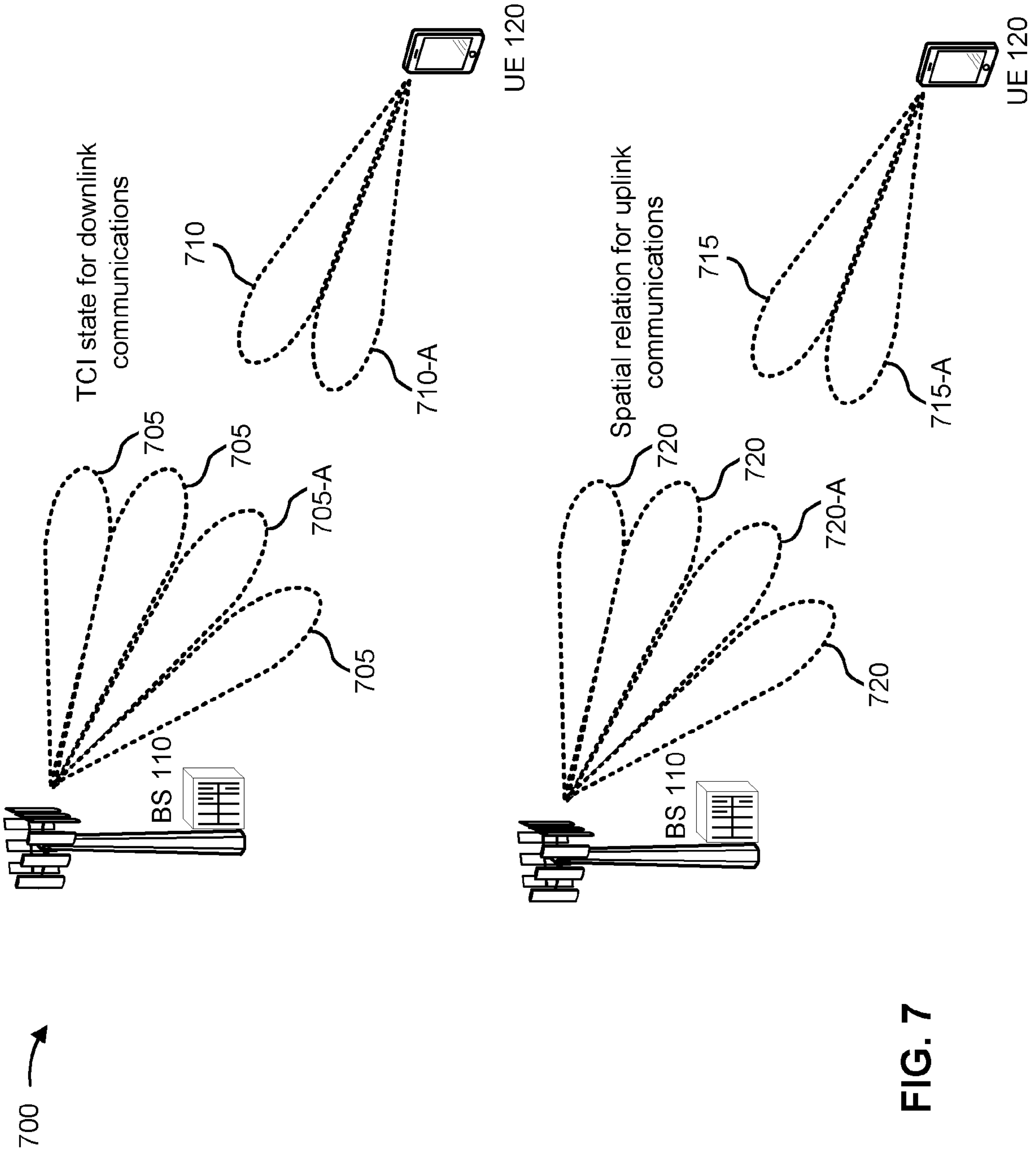
FIG. 7 is a diagram illustrating an example of using beams for communications between a base station and a UE, in accordance with the present disclosure.

FIG. 7 is a diagram illustrating an example 700 of using beams for communications between a base station and a UE, in accordance with the present disclosure. As shown in FIG. 7, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 705.

The UE 120 may attempt to receive downlink transmissions via one or more UE receive beams 710, which may be configured using different beamforming parameters at receive circuitry of the UE 120. The UE 120 may identify a particular BS transmit beam 705, shown as BS transmit beam 705-A, and a particular UE receive beam 710, shown as UE receive beam 710-A, that provide relatively favorable performance (for example, that have a best channel quality of the different measured combinations of BS transmit beams 705 and UE receive beams 710). In some examples, the UE 120 may transmit an indication of which BS transmit beam 705 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 705-A and the UE receive beam 710-A), which may be further refined and maintained in accordance with one or more established beam refinement procedures.

A downlink beam, such as a BS transmit beam 705 or a UE receive beam 710, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 705 may be associated with a synchronization signal block (SSB), and the UE 120 may indicate a preferred BS transmit beam 705 by transmitting uplink transmissions in resources of the SSB that are associated with the preferred BS transmit beam 705. A particular SSB may have an associated TCI state (for example, for an antenna port or for beamforming). The base station 110 may, in some examples, indicate a downlink BS transmit beam 705 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 710 at the UE 120. Thus, the UE 120 may select a corresponding UE receive beam 710 from a set of BPLs based at least in part on the base station 110 indicating a BS transmit beam 705 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 715.

The base station 110 may receive uplink transmissions via one or more BS receive beams 720. The base station 110 may identify a particular UE transmit beam 715, shown as UE transmit beam 715-A, and a particular BS receive beam 720, shown as BS receive beam 720-A, that provide relatively favorable performance (for example, that have a best channel quality of the different measured combinations of UE transmit beams 715 and BS receive beams 720). In some examples, the base station 110 may transmit an indication of which UE transmit beam 715 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 715-A and the BS receive beam 720-A), which may be further refined and maintained in accordance with one or more established beam refinement procedures. An uplink beam, such as a UE transmit beam 715 or a BS receive beam 720, may be associated with a spatial relation. A spatial relation may indicate a directionality or a characteristic of the uplink beam, similar to one or more QCL properties, as described above.

3GPP standards Release 17 established a unified TCI state framework in which a TCI state may be used to indicate more than one beam. The TCI state may be used to indicate beams for a downlink channel or RS (such as PDCCH/PDSCH/CSI-RS) and/or an uplink channel or RS (such as PUCCH/PUSCH/SRS). There may be multiple types of unified TCI states. For example, a joint downlink/uplink common TCI state (joint TCI) may indicate a common beam for at least one downlink channel or RS and at least one uplink channel or RS. A separate downlink common TCI state (downlink TCI) may indicate a common beam for more than one downlink channel or RS. A separate uplink common TCI state (uplink TCI) may indicate a common beam for more than one uplink channel or RS. Other types of unified TCI states may include a separate downlink single channel or RS TCI state that indicates a beam for a single downlink channel or RS, a separate uplink single channel or RS TCI state that indicates a beam for a single uplink channel or RS, or an uplink spatial relation information, such as a spatial relation indicator (SRI), that indicates a beam for a single uplink channel or RS.

The UE 120 may use beam failure detection (BFD) to determine if a beam has failed. BFD may involve monitoring and measuring CSI-RSs and/or SSBs that use a particular beam. If the measurements satisfy a threshold (e.g., minimum RSRP, minimum RSRQ, minimum signal to interference ratio (SIR), maximum block error rate (BLER)), the UE 120 may determine that failure of the beam has been detected. The measurements may be considered within a time limit and/or based on a counter.

If there is a beam failure, the UE 120 may perform BFR. BFR may involve a random access procedure or transmitting a beam failure recovery request to the base station 110. The recovery request may include an indication of a new beam (e.g., preferred candidate beam, available candidate beam) that may be used for a beam reset for a primary cell (PCell) or primary secondary cell (PSCell). In Release 15, the base station 110 may transmit a response to the recovery request, such as a PDCCH communication with a new cellular random network temporary identifier (C-RNTI) in a CORESET and search space set configured for beam failure recovery. The UE 120 may reset the beam (e.g., to the candidate beam) after 28 symbols from a last symbol of a first PDCCH reception in a search space set (provided by recoverySearchSpaceId) for which the UE detects DCI with a cyclic redundancy check (CRC) scrambled by a C-RNTI or an MCS-C-RNTI. The UE 120 may rest all PUCCH beams and power control parameters after receiving a BFR response. The UE 120 may use the candidate beam until the UE 120 receives an activation command for PUCCH-SpatialRelationInfo or is provided PUCCH-SpatialRelationInfo for PUCCH resources. The UE 120 may transmit a PUCCH communication on a same cell as a PRACH transmission using a same spatial filter that was used for the last PRACH transmission. The UE 120 may use a specified transmit power.

In a BFR scenario for Release 16, the PDCCH communication, as the response to the recovery request, may be in a DCI format that schedules a PUSCH transmission with the same hybrid automatic repeat request (HARQ) process ID as for the transmission of the first PUSCH carrying beam failure information and having a toggled new data indicator (NDI) field value. After 28 symbols from receiving a last symbol of the PDCCH communication, the UE 120 may monitor for PDCCH communications in all CORESETs on a secondary cell (SCell) indicated by a MAC control element (MAC CE) using the same antenna port QCL parameters as the QCL parameters associated with the corresponding index for a new beam (qnew). After receiving the BFR response, the UE 120 may reset all of the PUCCH beams and power control parameters for the SCell. The UE 120 may transmit a PUCCH communication on a PUCCH-SCell using the same spatial filter as a spatial filter for a new beam for periodic CSI-RS or SSB block reception, if the UE 120 is provided PUCCH-SpatialRelationInfo for the PUCCH, a location report request (LRR) was not transmitted or was transmitted on the PCell or the PSCell, and the PUCCH-SCell is included in the SCells indicated by the MAC CE.

BFR for Release 15 or Release 16 involves one BFR in a cell. However, in a multi-TRP scenario, a PUCCH transmission may be scheduled by a DCI from either TRP, and there may be multiple BFRs in a PUCCH-SCell. It has not been specified how to reset a beam after BFR if the beam is related to a unified TCI state with multiple TRPs.

As indicated above, FIG. 7 is provided as an example. Other examples may differ from what is described with respect to FIG. 7.

Figure 8:
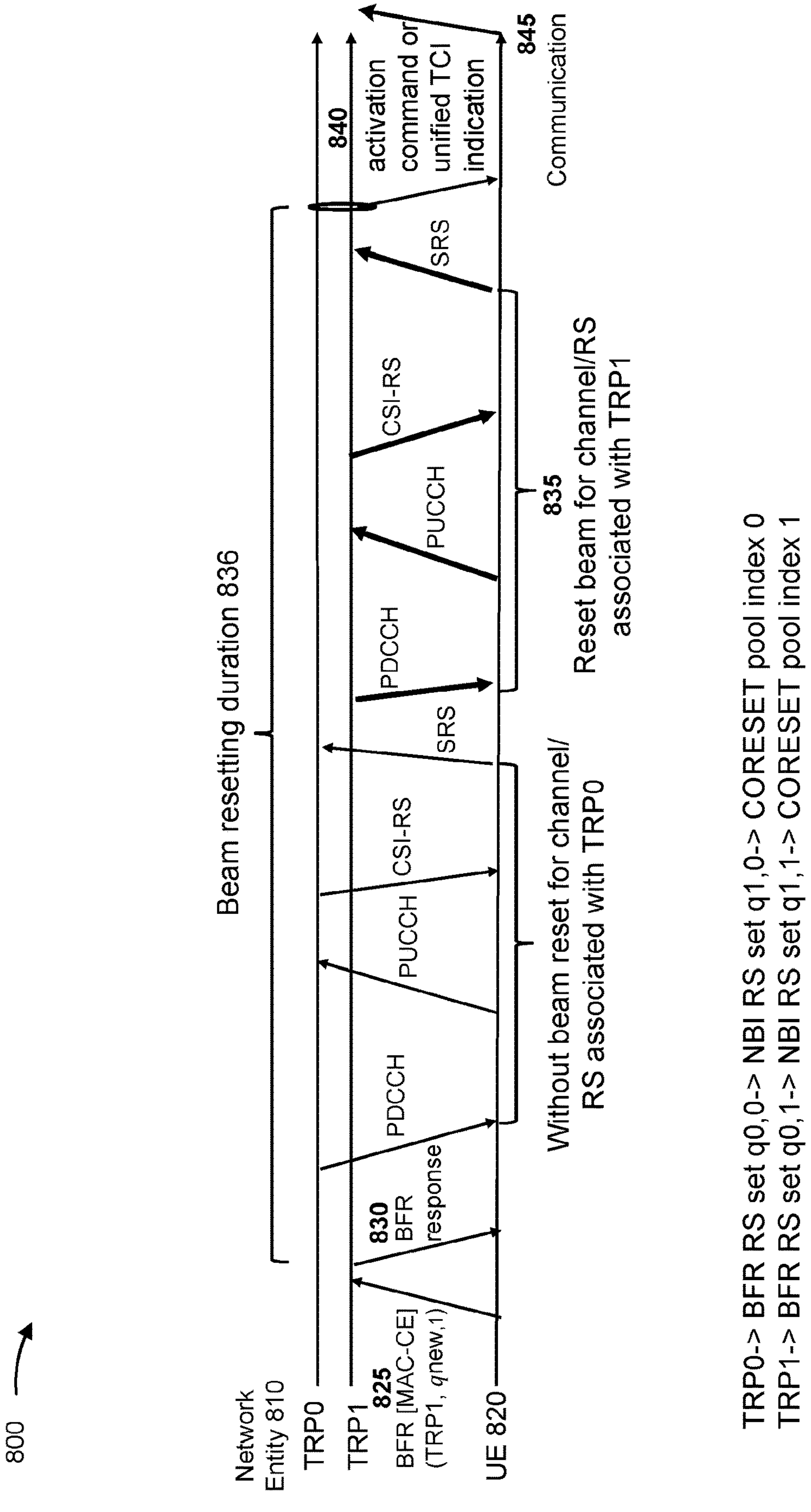
FIG. 8 is a diagram illustrating an example of transmit receive point-specific beam resetting, in accordance with the present disclosure.

FIG. 8 is a diagram illustrating an example 800 of TRP-specific beam resetting, in accordance with the present disclosure. As shown in FIG. 8, a network entity 810 (e.g., a UE 120, a network entity, component of a network entity) and a UE 820 (e.g., a UE 120, a network entity, a component of a network entity) may communicate with one another. The network entity may include or control multiple TRPs, such as TRP0 and TRP1. TRP1 may be associated with CORESET pool index 1. TRP0 may be associated with CORESET pool index 0. There may be beams to TRP0 and TRP1. In some aspects, there may be beams for more than two TRPs. In some aspects, different TRPs may be associated with other different IDs, such as close loop indexes, SRS resource set IDs, TCI IDs, or TCI group IDs.

The UE 820 may perform measurements of a beam for TRP1 in the corresponding beam detection reference source set. The link quality for the beam may have properties that do not satisfy (e.g., are lower than) one or more thresholds (e.g., RSRP, SIR, BLER). The UE 820 may detect that the first beam is failing.

The UE 820 may be configured to reset the beam that failed, in a per-TRP scenario, in association with a PUCCH resource (e.g., time-frequency resource on the PUCCH) that is specific to each TRP. UE 820 may reset the beam that failed with a new beam. The new beam may correspond to a beam index (e.g., qnew, 1) in the corresponding new candidate detection reference source set.

As shown by reference number 825, the UE 820 may transmit a BFR request (e.g., via a MAC CE or UCI) to the network entity 810. The recovery request may indicate the failed TRP information (e.g., TRP ID) and the new beam (e.g., qnew, 1) that may be used by the UE 820 to reset the beam that failed. As shown by reference number 830, TRP1 may transmit a BFR response to the UE 820. As shown in example 800, the UE 820 does not reset a beam for a channel/RS associated with TRP0, but the UE 820 may prepare to reset the first beam (set a new beam) for TRP1.

As shown by reference number 835, the UE 820 may reset the beam for TRP1 to the new beam (e.g., qnew, 1). The reset may occur a quantity of symbols (e.g., 28 symbols) after receiving the BFR response to the recovery request of the beam failure. The UE 820 may configure the UE 820 with QCL information and/or a spatial domain transmit filter that corresponds to the new beam.

According to various aspects described herein, the UE 820 may set the new beam for TRP1 for one or more channels and/or one or more reference signals that share a unified TCI state with one or more channels and/or one or more reference signals associated with the index of the new beam. The BFR message may include a (failed) TRP ID with the index of the new beam (for PDSCH/PDCCH receptions and/or PUCCH/PUSCH transmission in a component carrier (CC) associated with the failed TRP ID). The new beam may be set after a specified quantity of symbols from an end of the BFR response (received in a PDCCH communication of a special DCI indication, or in a PDCCH communication in a specific CORESET and a specific search space set). By specifying the channels and reference signals to which the beam reset applies for a unified TCI state, the UE 820 may have clarity when resetting beams in a unified TCI framework. As a result, communications on some channels or references may avoid degradation, and the UE 820 may conserve processing resources and signaling resources.

In some aspects, the beam reset for a unified TCI state may take place during a beam resetting duration 836 during which a beam reset can take place. A beam reset may not take place outside of the beam resetting duration 836. The starting or resetting condition for the beam resetting duration 836 may be a specified quantity of symbols (e.g., 28 symbols) from an end of the PDCCH communication that includes the BFR response. An ending condition for the beam resetting duration 836 may include receiving a unified TCI message, as shown by reference number 840. In some aspects, the unified TCI message may include a unified TCI activation command (e.g., MAC-CE) associated with a failed TRP ID for PDSCH/PDCCH receptions, as well as other signals/channels configured to sharing the same indicated unified TCI state as the PDSCH/PDCCH reception in a CC. In some aspects, the unified TCI message may include a unified TCI indication (e.g., DCI) associated with a failed TRP ID for PDSCH/PDCCH receptions, as well as other signals/channels configured to sharing the same indicated unified TCI state as the PDSCH/PDCCH reception in a CC.

TRP1 may activate a TCI that corresponds to the new beam (indexed by qnew, 1). TRP1 may receive a communication from UE 820 using the new beam, as shown by reference number 845. TRP1 may also transmit a communication to UE 820 using the new beam. The communication may be a PUCCH communication or an SRS. In some aspects, the communication may be a PUSCH communication.

In another example, if the UE 820 is provided a unified TCI state for a TRP ID, for serving cells of TRP0 associated with the first beam detection reference resource set $\overline{q}_{0,0}$ and the first new candidate beam reference resource set $\overline{q}_{1,0}$, and of TRP1 associated with the second beam detection reference resource set $\overline{q}_{0,1}$ and the second new candidate beam reference resource set $\overline{q}_{1,1}$, and having a radio link quality worse than a predetermined threshold $Q_{out,LR}$, after 28 symbols from a last symbol of a first PDCCH communication with a DCI format scheduling a PUSCH communication with a same HARQ process number as for transmission of the PUSCH communication having included the BFR message and having a toggled NDI field value, the UE 820 may assume antenna port quasi-collocation parameters. The parameters may correspond to $q_{new}$ from $\overline{q}_{1,0}$, if any, for all downlink and uplink channels and/or reference signals sharing the same indicated TCI state for the TRP ID mapped to $\overline{q}_{1,0}$; and correspond to $q_{new}$ from $\overline{q}_{1,1}$, if any, for all downlink and uplink channels and/or reference signals sharing the same indicated TCI state for the TRP ID mapped to $\overline{q}_{1,1}$. The subcarrier spacing (SCS) configuration for the 28 symbols may be the smallest of the SCS configurations of the active downlink bandwidth part (BWP) for the PDCCH reception and of the active downlink BWP(s) of the serving cells. The set of downlink and uplink channels and/or reference signals sharing the same indicated TCI state for a TRP may be determined based on a type of the TCI state. For example, if $q_{new}$ for a TRP is associated with a downlink TCI state, the UE 820 may assume antenna port quasi-collocation parameters corresponding to $q_{new}$, for any of PDCCH, PDSCH, and CSI-RS sharing the downlink TCI state for the TRP. If $q_{new}$ for a TRP is associated with an uplink TCI state, the UE 820 may apply a spatial transmit filter corresponding to $q_{new}$, for any of PUCCH, PUSCH, and SRS sharing the uplink TCI state for the TRP. If $q_{new}$ for a TRP is associated with a joint TCI state, the UE 820 may assume antenna port quasi-collocation parameters corresponding to $q_{new}$, for any of PDCCH, PDSCH, and CSI-RS sharing the joint TCI state for the TRP, and may apply a spatial transmit filter corresponding to $q_{new}$, for any of PUCCH, PUSCH, and SRS sharing the uplink TCI state for the TRP.

As indicated above, FIG. 8 is provided as an example. Other examples may differ from what is described with respect to FIG. 8.

Figure 9:
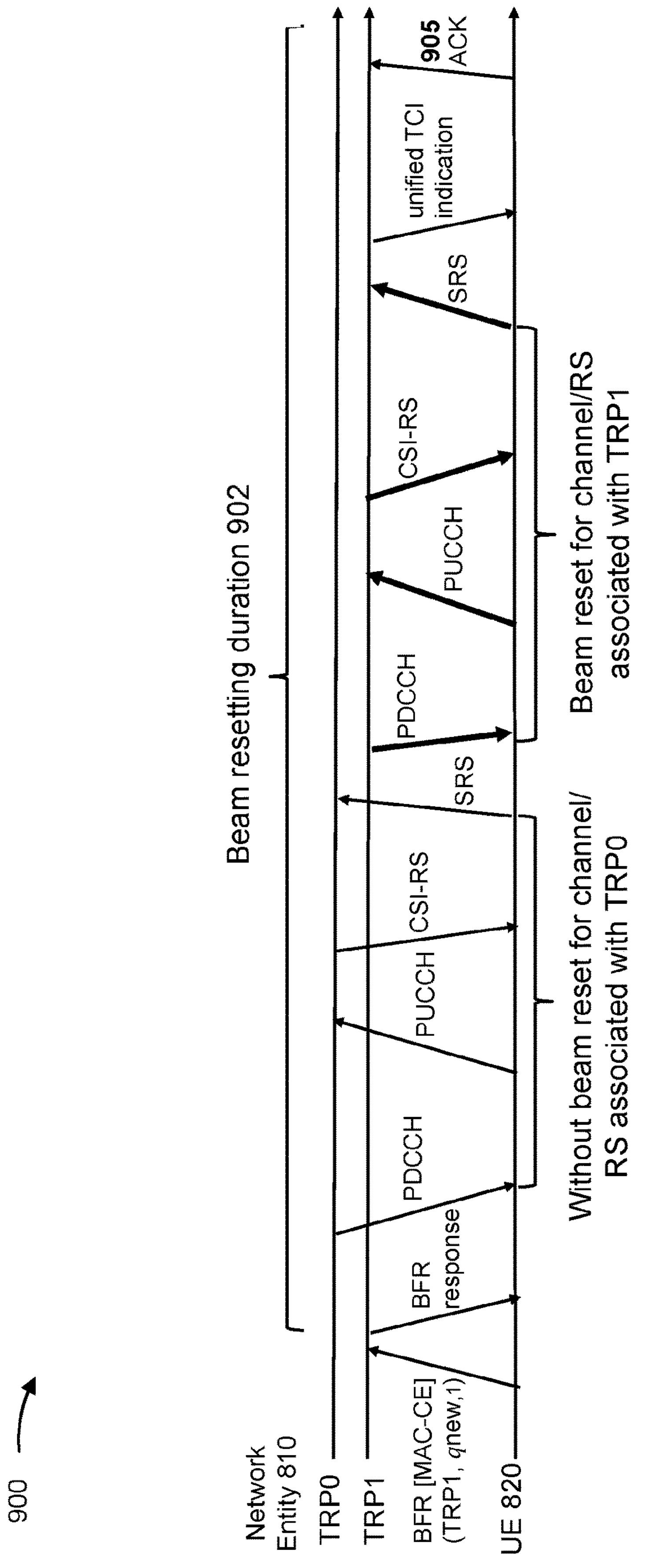
FIG. 9 is a diagram illustrating an example of a beam resetting duration, in accordance with the present disclosure.

FIG. 9 is a diagram illustrating an example 900 of a beam resetting duration 902, in accordance with the present disclosure.

In some aspects, an ending condition of the beam resetting duration 902 may occur a quantity of K symbols after the UE 820 transmits the ACK, as shown by reference number 905, to a unified TCI indication (e.g., DCI) associated with a failed TRP ID for PDSCH/PDCCH receptions, as well as other signals/channels configured to sharing the same indicated unified TCI state as the PDSCH/PDCCH reception in a CC. The quantity of K symbols may be determined by the TCI application time.

As indicated above, FIG. 9 is provided as an example. Other examples may differ from what is described with regard to FIG. 9.

Figure 10:
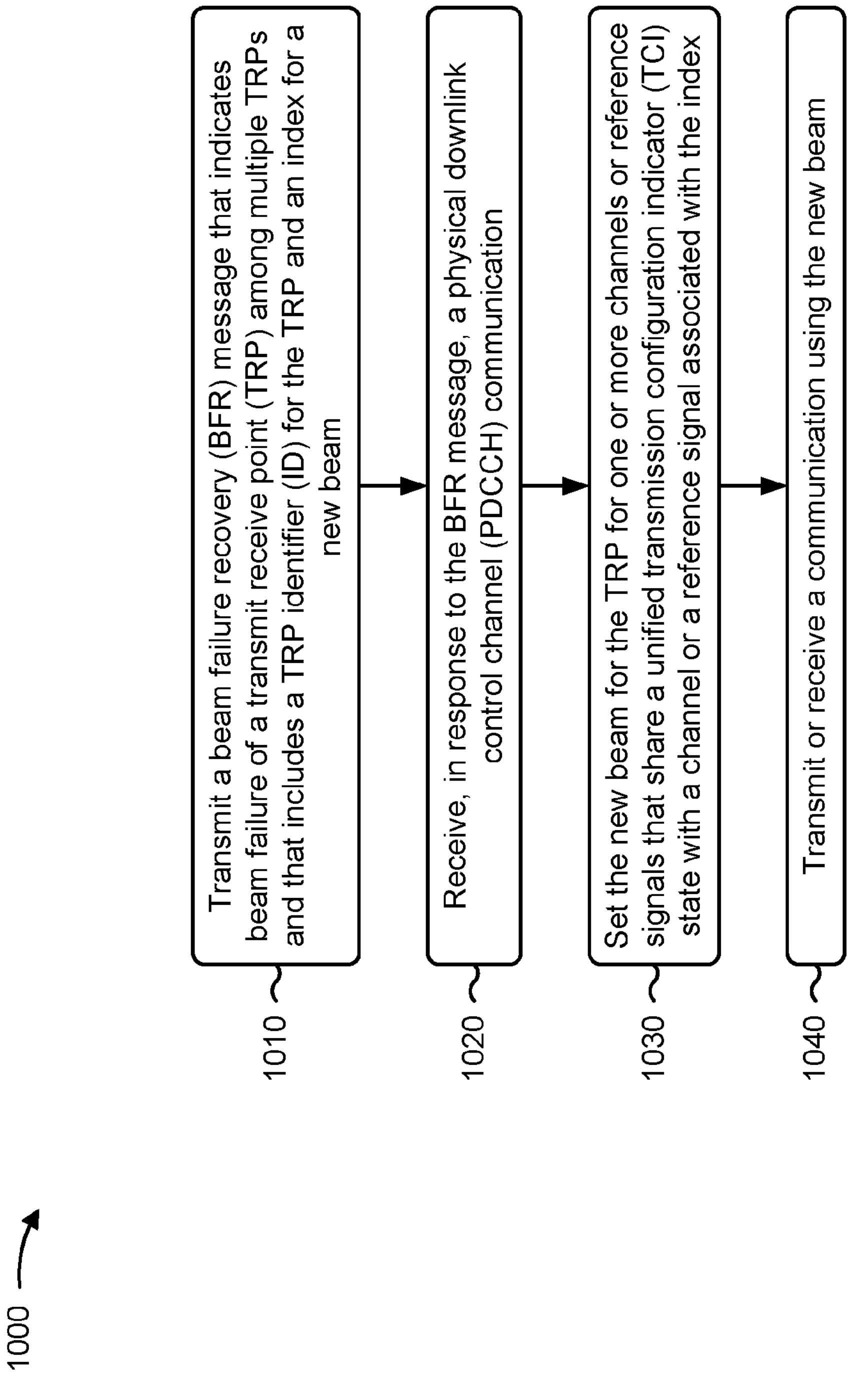
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120, UE 820) performs operations associated with setting a beam with a unified TCI state for a TRP among multiple TRPs.

As shown in FIG. 10, in some aspects, process 1000 may include transmitting a BFR message that indicates beam failure of a TRP among multiple TRPs and that includes a TRP ID for the TRP and an index for a new beam (block 1010). For example, the UE (e.g., using communication manager 1208 and/or transmission component 1204 depicted in FIG. 12) may transmit a BFR message that indicates beam failure of a TRP among multiple TRPs and that includes a TRP ID for the TRP and an index for a new beam, as described above.

As further shown in FIG. 10, in some aspects, process 1000 may include receiving, in response to the BFR message, a PDCCH communication (block 1020). For example, the UE (e.g., using communication manager and/or reception component 1202 depicted in FIG. 12) may receive, in response to the BFR message, a PDCCH communication, as described above.

As further shown in FIG. 10, in some aspects, process 1000 may include setting the new beam for the TRP for one or more channels or reference signals that share a unified TCI state with a channel or a reference signal associated with the index (block 1030). For example, the UE (e.g., using communication manager 1208 and/or setting component 1210 depicted in FIG. 12) may set the new beam for the TRP for one or more channels or reference signals that share a unified TCI state with a channel or a reference signal associated with the index, as described above.

As further shown in FIG. 10, in some aspects, process 1000 may include transmitting or receiving a communication using the new beam (block 1040). For example, the UE (e.g., using communication manager 1208, reception component 1202, and/or transmission component 1204 depicted in FIG. 12) may transmit or receive a communication using the new beam, as described above.

Process 1000 may include additional aspects, such as any single aspect or any combination of aspects described below and/or in connection with one or more other processes described elsewhere herein.

In a first aspect, setting the new beam includes setting the new beam after a specified quantity of symbols from an end of the PDCCH communication.

In a second aspect, alone or in combination with the first aspect, process 1000 includes receiving a unified TCI message associated with the TRP ID, where a resetting condition during which the new beam is to be set ends in response to receiving the unified TCI message.

In a third aspect, alone or in combination with one or more of the first and second aspects, the unified TCI message is an indication in DCI.

In a fourth aspect, alone or in combination with one or more of the first through third aspects, the unified TCI message is an activation command in a MAC CE.

In a fifth aspect, alone or in combination with one or more of the first through fourth aspects, process 1000 includes receiving a unified TCI indication in DCI associated with the TRP ID, and transmitting a feedback message for the DCI, where a resetting condition during which the new beam is to be set ends a specified quantity of symbols after transmitting the feedback message.

In a sixth aspect, alone or in combination with one or more of the first through fifth aspects, the communication is an SRS.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
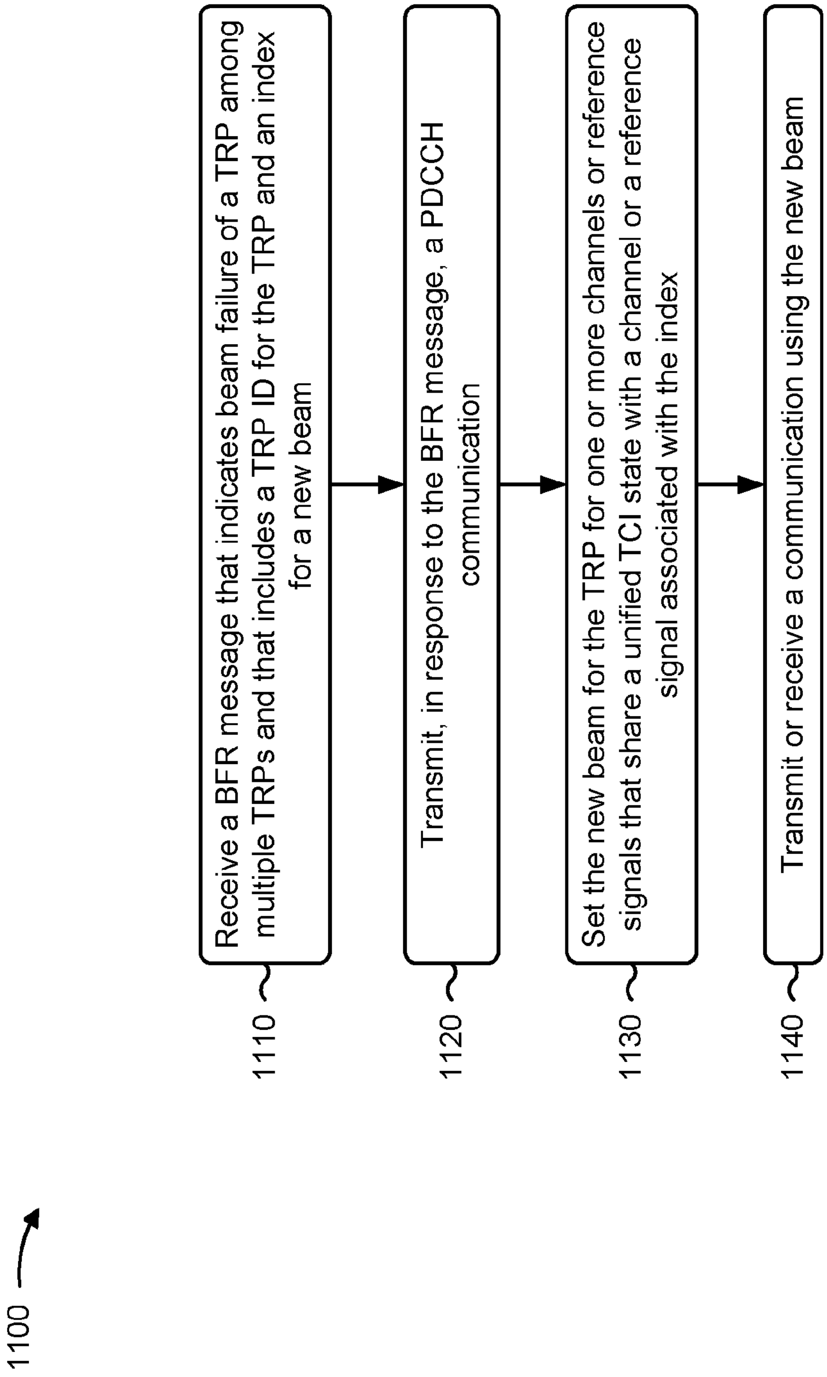
FIG. 11 is a diagram illustrating an example process performed, for example, by a network entity, in accordance with the present disclosure.

FIG. 11 is a diagram illustrating an example process 1100 performed, for example, by a network entity, in accordance with the present disclosure. Example process 1100 is an example where the network entity (e.g., base station 110, network entity 810) performs operations associated with indicating a unified TCI state for resetting a beam for a TRP among multiple TRPs.

As shown in FIG. 11, in some aspects, process 1100 may include receiving a BFR message that indicates beam failure of a TRP among multiple TRPs and that includes a TRP ID for the TRP and an index for a new beam (block 1110). For example, the network entity (e.g., using communication manager 1308 and/or reception component 1302 depicted in FIG. 13) may receive a BFR message that indicates beam failure of a TRP among multiple TRPs and that includes a TRP ID for the TRP and an index for a new beam, as described above.

As further shown in FIG. 11, in some aspects, process 1100 may include transmitting, in response to the BFR message, a PDCCH communication (block 1120). For example, the network entity (e.g., using communication manager 1308 and/or transmission component 1304 depicted in FIG. 13) may transmit, in response to the BFR message, a PDCCH communication, as described above.

As further shown in FIG. 11, in some aspects, process 1100 may include setting the new beam for the TRP for one or more channels or reference signals that share a unified TCI state with a channel or a reference signal associated with the index (block 1130). For example, the network entity (e.g., using communication manager 1308 and/or setting component 1310 depicted in FIG. 13) may set the new beam for the TRP for one or more channels or reference signals that share a unified TCI state with a channel or a reference signal associated with the index, as described above.

As further shown in FIG. 11, in some aspects, process 1100 may include transmitting or receiving a communication using the new beam (block 1140). For example, the network entity (e.g., using communication manager 1308, transmission component 1303, and/or reception component 1302 depicted in FIG. 13) may transmit or receive a communication using the new beam, as described above.

Process 1100 may include additional aspects, such as any single aspect or any combination of aspects described below and/or in connection with one or more other processes described elsewhere herein.

In a first aspect, setting the new beam includes setting the new beam after a specified quantity of symbols from an end of the PDCCH communication.

In a second aspect, alone or in combination with the first aspect, process 1100 includes transmitting a unified TCI message associated with the TRP ID, where a resetting condition during which the new beam is to be set ends in response to receiving the unified TCI message.

In a third aspect, alone or in combination with one or more of the first and second aspects, the unified TCI message is an indication in DCI.

In a fourth aspect, alone or in combination with one or more of the first through third aspects, the unified TCI message is an activation command in a MAC CE.

In a fifth aspect, alone or in combination with one or more of the first through fourth aspects, process 1100 includes transmitting a unified TCI indication in DCI associated with the TRP ID, and receiving a feedback message for the DCI, where a resetting condition during which the new beam is to be set ends a specified quantity of symbols after transmitting the feedback message.

In a sixth aspect, alone or in combination with one or more of the first through fifth aspects, the communication is an SRS.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
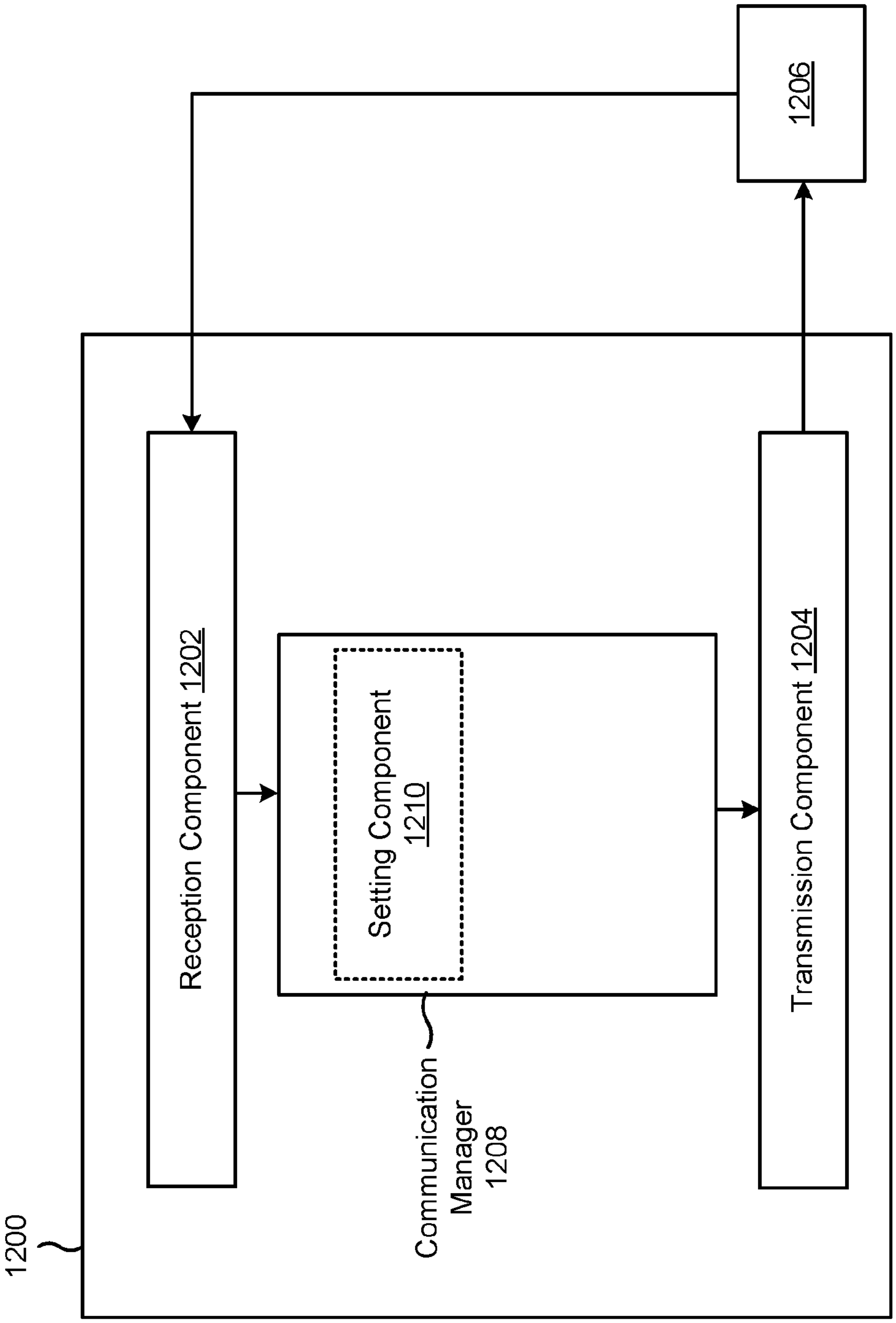
FIGS. 12-13 are diagrams of example apparatuses for wireless communication, in accordance with the present disclosure.

FIG. 12 is a diagram of an example apparatus 1200 for wireless communication. The apparatus 1200 may be a UE (e.g., a UE 120, UE 820), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the UE described in connection with FIG. 2. The communication manager 1208 may be, or be similar to, the communication manager 150 depicted in FIGS. 1 and 2. For example, in some aspects, the communication manager 1208 may be configured to perform one or more of the functions described as being performed by the communication manager 150. In some aspects, the communication manager 1208 may include the reception component 1202 and/or the transmission component 1204. The communication manager 1208 may include a setting component 1210, among other examples.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The transmission component 1204 may transmit a BFR message that indicates beam failure of a TRP among multiple TRPs and that includes a TRP ID for the TRP and an index for a new beam. The reception component 1202 may receive, in response to the BFR message, a PDCCH communication. The setting component 1310 may set the new beam for the TRP for one or more channels or reference signals that share a unified TCI state with a channel or a reference signal associated with the index. The transmission component 1204 may transmit a communication or the reception component may receive a communication using the new beam.

In some aspects, the reception component 1202 may receive a unified TCI message associated with the TRP ID, where a resetting condition during which the new beam is to be set ends in response to receiving the unified TCI message. The reception component 1202 may receive a unified TCI indication in DCI associated with the TRP ID.

In some aspects, the transmission component 1204 may transmit a feedback message for the DCI, where a resetting condition during which the new beam is to be set ends a specified quantity of symbols after transmitting the feedback message.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
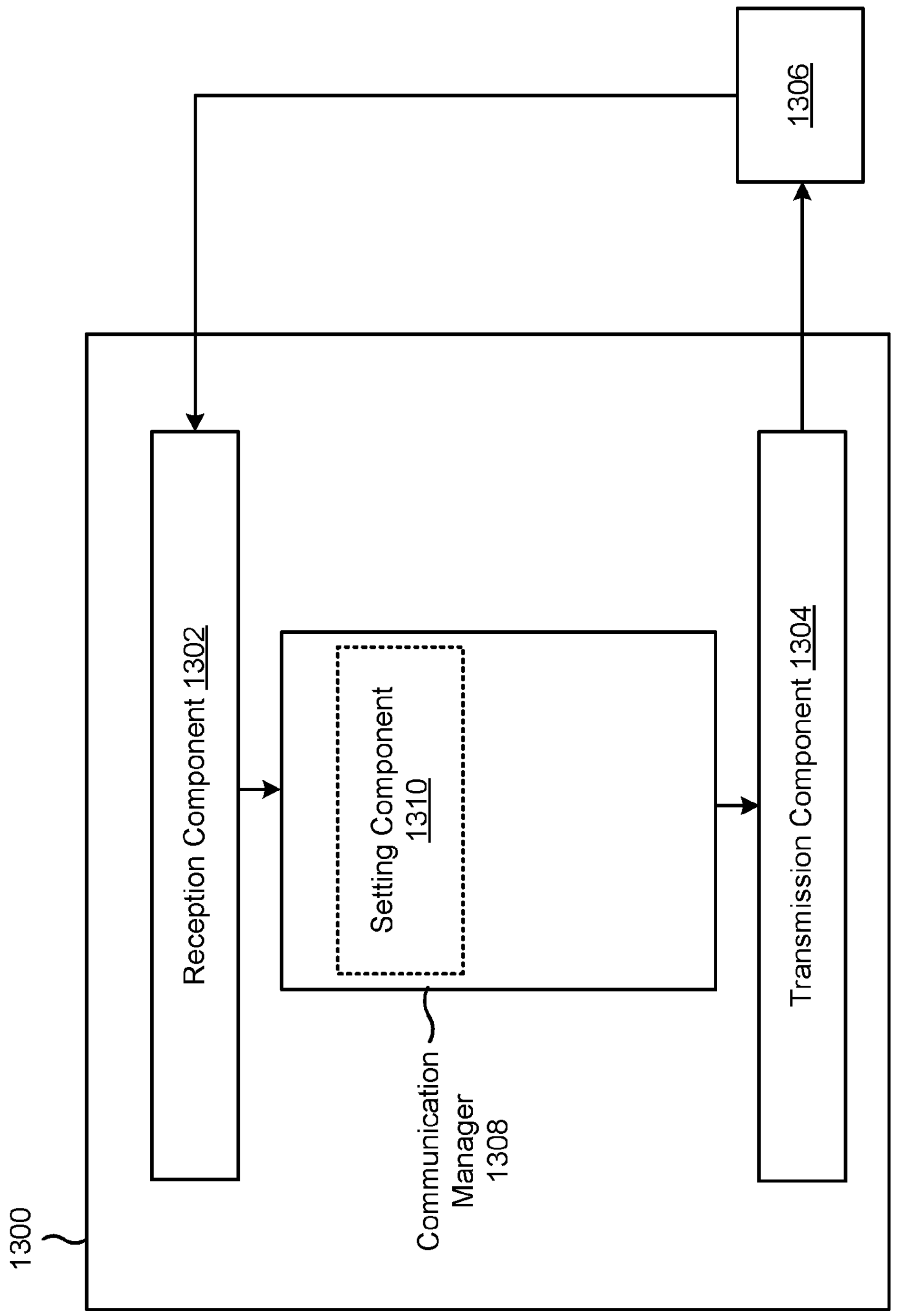

FIG. 13 is a diagram of an example apparatus 1300 for wireless communication. The apparatus 1300 may be a network entity (e.g., base station 110, network entity 810), or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, network entity, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the base station described in connection with FIG. 2. The communication manager 1308 may be, or be similar to, the communication manager 150 depicted in FIGS. 1 and 2. For example, in some aspects, the communication manager 1308 may be configured to perform one or more of the functions described as being performed by the communication manager 150. In some aspects, the communication manager 1308 may include the reception component 1302 and/or the transmission component 1304. The communication manager 1308 may include a setting component 1310, among other examples.

In some aspects, the apparatus 1300 may be configured to perform one or more operations described herein in connection with FIGS. 1-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The reception component 1302 may receive a BFR message that indicates beam failure of a TRP among multiple TRPs and that includes a TRP ID for the TRP and an index for a new beam. The transmission component 1304 may transmit, in response to the BFR message, a PDCCH communication. The setting component 1310 may set the new beam for the TRP for one or more channels or reference signals that share a unified TCI state with a channel or a reference signal associated with the index. The reception component 1302 may receive a communication or the transmission component 1304 may transmit a communication using the new beam.

The transmission component 1304 may transmit a unified TCI message associated with the TRP ID, where a resetting condition during which the new beam is to be set ends in response to receiving the unified TCI message. The transmission component 1304 may transmit a unified TCI indication in DCI associated with the TRP ID.

The reception component 1302 may receive a feedback message for the DCI, where a resetting condition during which the new beam is to be set ends a specified quantity of symbols after transmitting the feedback message.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: transmitting a beam failure recovery (BFR) message that indicates beam failure of a transmit receive point (TRP) among multiple TRPs and that includes a TRP identifier (ID) for the TRP and an index for a new beam; receiving, in response to the BFR message, a physical downlink control channel (PDCCH) communication; setting the new beam for the TRP for one or more channels or reference signals that share a unified transmission configuration indicator (TCI) state with a channel or a reference signal associated with the index; and transmitting or receiving a communication using the new beam.

Aspect 2: The method of Aspect 1, wherein setting the new beam includes setting the new beam after a specified quantity of symbols from an end of the PDCCH communication.

Aspect 3: The method of Aspect 1 or 2, further comprising receiving a unified TCI message associated with the TRP ID, wherein a resetting condition during which the new beam is to be set ends in response to receiving the unified TCI message.

Aspect 4: The method of Aspect 3, wherein the unified TCI message is an indication in downlink control information.

Aspect 5: The method of Aspect 3, wherein the unified TCI message is an activation command in a medium access control control element (MAC CE).

Aspect 6: The method of Aspect 1 or 2, further comprising: receiving a unified TCI indication in downlink control information (DCI) associated with the TRP ID; and transmitting a feedback message for the DCI, wherein a resetting condition during which the new beam is to be set ends a specified quantity of symbols after transmitting the feedback message.

Aspect 7: The method of any of Aspects 1-6, wherein the communication is a sounding reference signal.

Aspect 8: A method of wireless communication performed by a network entity, comprising: receiving a beam failure recovery (BFR) message that indicates beam failure of a transmit receive point (TRP) among multiple TRPs and that includes a TRP identifier (ID) for the TRP and an index for a new beam; transmitting, in response to the BFR message, a physical downlink control channel (PDCCH) communication; setting the new beam for the TRP for one or more channels or reference signals that share a unified transmission configuration indicator (TCI) state with a channel or a reference signal associated with the index; and transmitting or receiving a communication using the new beam.

Aspect 9: The method of Aspect 8, wherein setting the new beam includes setting the new beam after a specified quantity of symbols from an end of the PDCCH communication.

Aspect 10: The method of Aspect 8 or 9, further comprising transmitting a unified TCI message associated with the TRP ID, wherein a resetting condition during which the new beam is to be set ends in response to receiving the unified TCI message.

Aspect 11: The method of Aspect 10, wherein the unified TCI message is an indication in downlink control information.

Aspect 12: The method of Aspect 10, wherein the unified TCI message is an activation command in a medium access control control element (MAC CE).

Aspect 13: The method of Aspect 8 or 9, further comprising: transmitting a unified TCI indication in downlink control information (DCI) associated with the TRP ID; and receiving a feedback message for the DCI, wherein a resetting condition during which the new beam is to be set ends a specified quantity of symbols after transmitting the feedback message.

Aspect 14: The method of any of Aspects 8-13, wherein the communication is a sounding reference signal.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

transmitting a beam failure recovery (BFR) message that indicates beam failure of a transmit receive point (TRP) among multiple TRPs and that includes a TRP identifier (ID) for the TRP and an index for a new beam;

receiving, in response to the BFR message, a physical downlink control channel (PDCCH) communication;

setting the new beam for the TRP for one or more channels or reference signals that share a unified transmission configuration indicator (TCI) state with a channel or a reference signal associated with the index; and transmitting or receiving a communication using the new beam.

2. The method of claim 1, wherein setting the new beam includes setting the new beam after a specified quantity of symbols from an end of the PDCCH communication.

3. The method of claim 1, further comprising receiving a unified TCI message associated with the TRP ID, wherein a resetting condition during which the new beam is to be set ends in response to receiving the unified TCI message.

4. The method of claim 3, wherein the unified TCI message is an indication in downlink control information.

5. The method of claim 3, wherein the unified TCI message is an activation command in a medium access control control element (MAC CE).

6. The method of claim 1, further comprising:

receiving a unified TCI indication in downlink control information (DCI) associated with the TRP ID; and transmitting a feedback message for the DCI, wherein a resetting condition during which the new beam is to be set ends a specified quantity of symbols after transmitting the feedback message.

7. The method of claim 1, wherein the communication is a sounding reference signal.

8. A method of wireless communication performed by a network entity, comprising:

receiving a beam failure recovery (BFR) message that indicates beam failure of a transmit receive point (TRP) among multiple TRPs and that includes a TRP identifier (ID) for the TRP and an index for a new beam;

transmitting, in response to the BFR message, a physical downlink control channel (PDCCH) communication;

setting the new beam for the TRP for one or more channels or reference signals that share a unified transmission configuration indicator (TCI) state with a channel or a reference signal associated with the index; and transmitting or receiving a communication using the new beam.

9. The method of claim 8, wherein setting the new beam includes setting the new beam after a specified quantity of symbols from an end of the PDCCH communication.

10. The method of claim 8, further comprising transmitting a unified TCI message associated with the TRP ID, wherein a resetting condition during which the new beam is to be set ends in response to receiving the unified TCI message.

11. The method of claim 10, wherein the unified TCI message is an indication in downlink control information.

12. The method of claim 10, wherein the unified TCI message is an activation command in a medium access control control element (MAC CE).

13. The method of claim 8, further comprising:

transmitting a unified TCI indication in downlink control information (DCI) associated with the TRP ID; and receiving a feedback message for the DCI, wherein a resetting condition during which the new beam is to be set ends a specified quantity of symbols after transmitting the feedback message.

14. The method of claim 8, wherein the communication is a sounding reference signal.

15. A user equipment (UE) for wireless communication, comprising:

one or more memories; and one or more processors, coupled to the one or more memories, individually or collectively configured to:

transmit a beam failure recovery (BFR) message that indicates beam failure of a transmit receive point (TRP) among multiple TRPs and that includes a TRP identifier (ID) for the TRP and an index for a new beam;

receive, in response to the BFR message, a physical downlink control channel (PDCCH) communication;

set the new beam for the TRP for one or more channels or reference signals that share a unified transmission configuration indicator (TCI) state with a channel or a reference signal associated with the index; and transmit or receive communication using the new beam.

16. The UE of claim 15, wherein the one or more processors, to set the new beam, are configured to set the new beam after a specified quantity of symbols from an end of the PDCCH communication.

17. The UE of claim 15, wherein the one or more processors are configured to receive a unified TCI message associated with the TRP ID, wherein a resetting condition during which the new beam is to be set ends in response to receiving the unified TCI message.

18. The UE of claim 17, wherein the unified TCI message is an indication in downlink control information.

19. The UE of claim 17, wherein the unified TCI message is an activation command in a medium access control control element (MAC CE).

20. The UE of claim 15, wherein the one or more processors are configured to:

receive a unified TCI indication in downlink control information (DCI) associated with the TRP ID; and transmit a feedback message for the DCI, wherein a resetting condition during which the new beam is to be set ends a specified quantity of symbols after transmitting the feedback message.

21. The UE of claim 15, wherein the communication is a sounding reference signal.

22. A network entity for wireless communication, comprising:

one or more memories; and one or more processors, coupled to the one or more memories, individually or collectively configured to:

receive a beam failure recovery (BFR) message that indicates beam failure of a transmit receive point (TRP) among multiple TRPs and that includes a TRP identifier (ID) for the TRP and an index for a new beam;

transmit, in response to the BFR message, a physical downlink control channel (PDCCH) communication;

set the new beam for the TRP for one or more channels or reference signals that share a unified transmission configuration indicator (TCI) state with a channel or a reference signal associated with the index; and transmit or receive a communication using the new beam.

23. The network entity of claim 22, wherein the one or more processors, to set the new beam, are configured to set the new beam after a specified quantity of symbols from an end of the PDCCH communication.

24. The network entity of claim 22, wherein the one or more processors are configured to transmit a unified TCI message associated with the TRP ID, wherein a resetting condition during which the new beam is to be set ends in response to receiving the unified TCI message.

25. The network entity of claim 24, wherein the unified TCI message is an indication in downlink control information.

26. The network entity of claim 24, wherein the unified TCI message is an activation command in a medium access control control element (MAC CE).

27. The network entity of claim 22, wherein the one or more processors are configured to:

transmit a unified TCI indication in downlink control information (DCI) associated with the TRP ID; and receive a feedback message for the DCI, wherein a resetting condition during which the new beam is to be set ends a specified quantity of symbols after transmitting the feedback message.

28. The network entity of claim 22, wherein the communication is a sounding reference signal.

* * * * *